US012430969B2

(12) United States Patent
Chiquette

(10) Patent No.: US 12,430,969 B2
(45) Date of Patent: Sep. 30, 2025

(54) ELECTRONIC LOCK

(71) Applicant: DORMAKABA CANADA INC., Montréal (CA)

(72) Inventor: Alain Chiquette, Montréal (CA)

(73) Assignee: DORMAKABA CANADA INC., Montréal (CA)

( * ) Notice: Subject to any disclaimer, the term of this patent is extended or adjusted under 35 U.S.C. 154(b) by 65 days.

(21) Appl. No.: 18/591,251

(22) Filed: Feb. 29, 2024

(65) Prior Publication Data

US 2025/0278967 A1 Sep. 4, 2025

(51) Int. Cl.
*G07C 9/00* (2020.01)

(52) U.S. Cl.
CPC ....... *G07C 9/0069* (2013.01); *G07C 9/00944* (2013.01)

(58) Field of Classification Search
CPC .............. G07C 9/0069; G07C 9/00944; G07C 2009/0096
USPC .......................................................... 70/278.1
See application file for complete search history.

(56) References Cited

U.S. PATENT DOCUMENTS 11,131,114 B2* 9/2021 Magnan .................... E05B 3/06
11,156,020 B2* 10/2021 Lin ..................... E05B 47/0001
11,255,105 B2* 2/2022 Poiré ....................... E05B 15/02
11,643,845 B2* 5/2023 Uyeda ................... E05B 47/026 70/278.1
2008/0012515 A1* 1/2008 Murray ............. G07C 9/00174 318/282
2010/0212373 A1* 8/2010 Wheeler ............. E05B 17/0058 70/91
2010/0219935 A1* 9/2010 Bingle .................... E05B 81/76 340/5.54
2014/0250956 A1* 9/2014 Chong ............... G07C 9/00944 70/278.1
2015/0262440 A1* 9/2015 Gartner ............. G07C 9/00912 340/5.54
2016/0371907 A1* 12/2016 Ma ........................ G06F 3/0227
2016/0376819 A1* 12/2016 Bingle .................... E05B 85/16 70/266
2017/0198496 A1* 7/2017 Beck ....................... E05B 17/22
2017/0221291 A1* 8/2017 Gokcebay ............. E05B 65/025
2018/0073275 A1* 3/2018 Ullrich ............... G07C 9/00182
2018/0266146 A1* 9/2018 Huang .................... F16D 11/16
2018/0291650 A1* 10/2018 Zabala Zabaleta .......................... E05B 47/0012
2018/0298639 A1* 10/2018 Rais .................... E05B 47/0001
2018/0315265 A1* 11/2018 Zabala Zabaleta .......................... G07C 9/00912
2019/0352930 A1* 11/2019 Beck ....................... E05B 17/22
(Continued)

*Primary Examiner* — Nathan Cumar
(74) *Attorney, Agent, or Firm* — Alexandre Daoust; Norton Rose Fulbright Canada LLP

(57) ABSTRACT

The electronic lock can have a housing having a wall portion being flat, and a keypad. The keypad can have a sequence of characters aligned along an axis parallel to the wall portion, defined by corresponding translucent areas extending across the thickness of the wall portion; a set of touch sensors underlying corresponding ones of the characters of the sequence; a light guide underlying the wall portion, the light guide being flat, parallel to the wall portion, and having a thickness, the light guide being optically coupled to the translucent areas via the internal face; and a light source offset from the plurality of characters, operable to propagate light into an edge surface of the light guide, for the light to propagate within the light guide in a direction of the axis.

19 Claims, 6 Drawing Sheets

(56) References Cited

U.S. PATENT DOCUMENTS

| | | | | |
|---|---|---|---|---|
| 2020/0018090 | A1* | 1/2020 | Magnan | E05B 3/06 |
| 2020/0219341 | A1* | 7/2020 | Khalid | G07C 9/00896 |
| 2020/0263449 | A1* | 8/2020 | Rai | G07C 9/00571 |
| 2020/0327757 | A1* | 10/2020 | Kelley | G07C 9/00309 |
| 2021/0366214 | A1* | 11/2021 | Gant | G06K 7/10297 |
| 2022/0012683 | A1* | 1/2022 | Taylor | G07C 9/00896 |
| 2022/0098901 | A1* | 3/2022 | Gartner | E05B 47/0607 |
| 2022/0122392 | A1* | 4/2022 | Wind | H02S 40/38 |
| 2023/0193660 | A1* | 6/2023 | Lin | E05B 47/02 70/279.1 |
| 2023/0243186 | A1* | 8/2023 | LeBlanc | G07C 9/00674 70/278.1 |

* cited by examiner

ELECTRONIC LOCK

BACKGROUND

Electrically powered electronic locks have become more and more popular over recent years due to several conveniences which electronic access procedures can have over the mechanical access afforded by physical keys.

Indeed, electronic locks control physical access to premises based on a computerized authorization check. Different locks can have different ways of performing the authorization check, which typically involve comparing access credentials received via an input interface with access data made accessible to a processor of the electronic lock. Access credentials may be encoded in a keycard or in an electronic user device (e.g., smartphone), and associated input interfaces may include an antenna for instance. Access credentials may also be communicated via a user code received from a user, and the associated input interface may include a keypad. By contrast, in the case of mechanical locks, the access credentials are encoded in the geometrical shape of the physical key. Some electronic locks can have more than one means of inputting the access credentials, such as being adapted to receive an input either from a keycard, electronic device, from a manually entered PIN, and/or via a physical key.

The electronic lock mechanically controls the access to the premises based on whether the authorization check results in a success or failure. For instance, the lock's computer can control an actuator to retract a deadbolt, or unblock the movement of a handle or latch bolt, contingent upon a success of the authorization check.

In some cases, electronic locks are connected to an external energy source, such as a municipal electricity network accessed via the building's electrical system. In other cases, electronic locks are connected to an internal energy source, such as a battery pack. Some electronic locks may be connected to both an external and an internal energy source. When electronic locks are powered by an internal energy source, and especially in cases where the internal energy source is the sole energy source of the lock, there can be a particular challenge in meeting functionality requests in a way which allows the energy consumption of the lock to remain sufficiently low for the energy source to last for a sufficient amount of time. Indeed, it can be preferred to use batteries as the energy source, for instance, and one requirement of the lock may be that the batteries last a sufficient amount of time for the inconvenience imposed to the user by the need to change the batteries to be relatively infrequent (e.g., less than once a year) and thus an acceptable trade-off for the level of functionality.

Several other considerations affect the design of electronic locks, including security, reliability (occurrences of users being locked out due to malfunction of the lock may be particularly undesirable), visual feature design considerations, and giving users an overall impression of quality when interfacing with the lock.

While previously existing electronic locks were satisfactory to a certain degree, there always remains room for improvement.

SUMMARY

In accordance with one aspect, there is provided a keypad comprising: a housing having a wall portion being flat, the wall portion having a thickness, an internal face, and an external face exposed to a user; a sequence of characters aligned along an axis parallel to the wall portion, the characters of the sequence defined by corresponding translucent areas extending across the thickness of the wall portion, the wall portion being opaque around the translucent areas; a set of touch sensors, the touch sensors of the set underlying corresponding ones of the characters of the sequence; a light guide underlying the wall portion, the light guide being flat, parallel to the wall portion, and having a thickness, the light guide being optically coupled to the translucent areas via the internal face; and a light source offset from the plurality of characters, operable to propagate light into an edge surface of the light guide, for the light to propagate within the light guide in a direction of the axis; wherein the characters of the sequence of characters are of a same font, and bolden from one character to another in the direction of the axis, said boldening of the characters in the direction of the axis compensating for optical losses in the light guide in the direction of the axis from a visual perspective of the user.

In accordance with another aspect, there is provided an electronic lock for locking or unlocking a door of a premises, the electronic lock comprising: at least one housing; a lock mechanism integrated to the at least one housing, the lock mechanism actuatable for said locking or unlocking of the door; an actuator coupled to the lock mechanism; a keypad having a wall portion of the at least one housing, the wall portion being flat and having an external face exposed to a user; a sequence of characters aligned along an axis parallel to the wall portion, defined by corresponding translucent areas of the wall portion; a set of touch sensors underlying corresponding ones of the characters of the sequence; a light guide underlying the wall portion, the light guide being flat and optically coupled to the translucent areas; and a light source offset from the plurality of characters, operable to propagate light into an edge surface of the light guide; a controller integrated to the at least one housing, the controller operatively connected to the actuator, to the keypad, and to the computer-readable memory, the controller operable to control the actuator for unlocking the door contingent upon validating access credentials received from the keypad against access data.

In accordance with another aspect, there is provided a keypad for an electronic lock, the keypad comprising: a front face having an exterior surface and an interior surface defining a thickness therebetween; a first character defined by a first translucent portion extending through the thickness of the front face; a second character defined by a second translucent portion extending through the thickness of the front face; and a light source positioned behind the interior surface of the front face and offset from at least one of the first translucent portion and the second translucent portion; wherein the first character is defined by a first dimension and the second character is defined by a second dimension, the second dimension is enlarged as compared to the first dimension.

In accordance with another aspect, there is provided a keypad comprising: a housing having a wall portion, the wall portion having a thickness, an internal face, and an external face exposed to a user; a sequence including a plurality of characters aligned along an axis parallel to the wall portion, the characters of the sequence defined by corresponding translucent areas extending across the thickness of the wall portion; a set of sensors, the sensors of the set underlying corresponding ones of the characters of the sequence; a light guide underlying the wall portion, the light guide being optically coupled to the translucent areas via the internal face; and a light source offset from the plurality of characters, operable to propagate light through the light guide in a direction of the axis; wherein the characters of the sequence of characters are enlargened from one character to another in the direction of the axis.

Many further features and combinations thereof concerning the present improvements will appear to those skilled in the art following a reading of the instant disclosure.

DESCRIPTION OF THE FIGURES

In the figures.

DETAILED DESCRIPTION

Figure 1B:
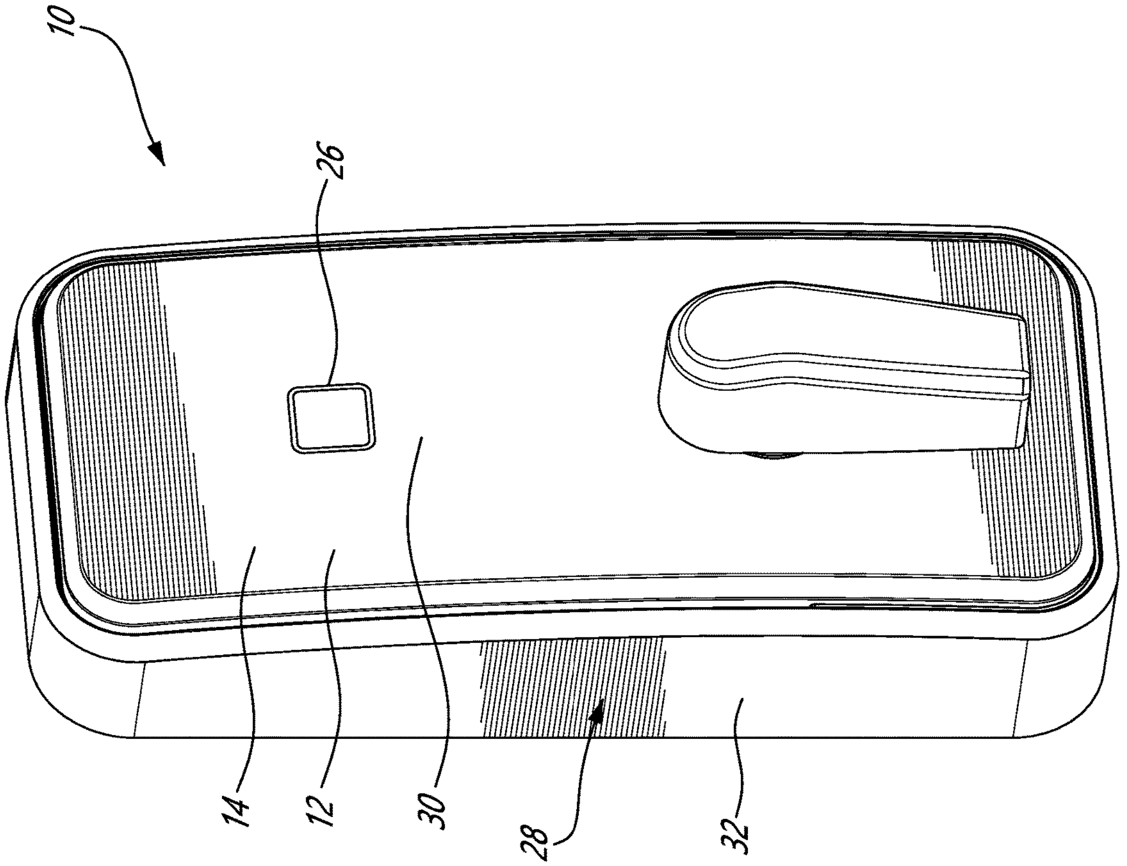
FIG. 1B is an oblique view of the electronic lock of FIG. 1A in a sleep state.
Figure 1A:
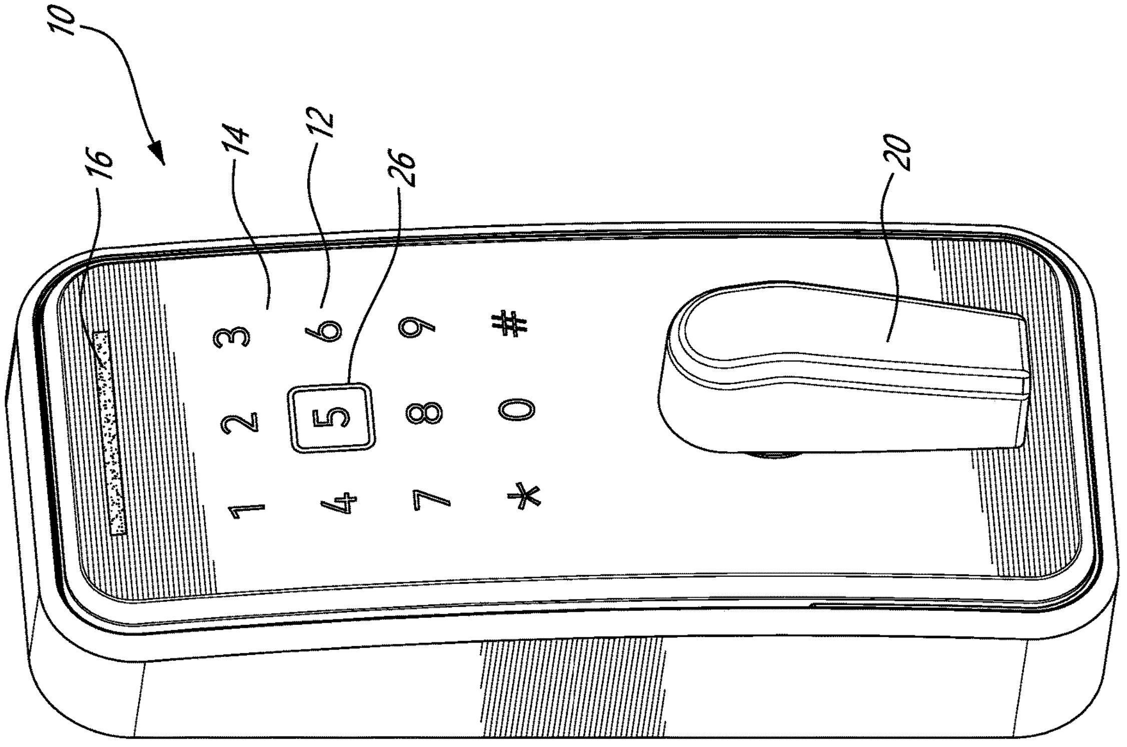
FIG. 1A is an oblique view of an example of an electronic lock, in an awake state.

FIG. 1A shows an example of an electronic lock 10. In this example, the electronic lock 10 has a user interface 12 including a keypad 14, a wireless signal transmitter (e.g., RFID antenna 18 seen in FIG. 2A) and a visual indicator 16. The electronic lock 10 can be mounted to a door of a premises (not shown). The electronic lock 10 has a locking member (not shown in FIG. 1A), such as a deadbolt or latch bolt, which can selectively block the opening of the door, thereby preventing unauthorized ingress into the premises, or unblock the opening of the door, thereby allowing authorized ingress into the premises. This selective operation can be entirely electronically controlled, such as via an actuator which directly pulls or pushes a deadbolt, or partially electronically controlled, such as via an actuator which toggles an intermediary member between a position where manual activation of the locking member is blocked or unblocked. More details will be provided below.

In the specific embodiment illustrated, the electronic lock 10 has a handle 20, provided here in the form of a knob, which is mechanically coupled to a sliding motion of a deadbolt (not shown). The electronic lock 10 has an electrical actuator controlling an engagement mechanism which can selectively engage or disengage the knob to the locking mechanism, allowing the rotation of the know to retract the deadbolt when engaged, while leaving the knob to freewheel when disengaged. Alternately the electronic lock 10 may an electrical actuator controlling a blocking mechanism which can selectively block or unblock the mechanical motion of the knob, thereby allowing a user to rotate the knob, and retract the deadbolt, only when the electrical actuator toggles the blocking mechanism to the unblocked configuration, to name one other possible example.

One way or another, the electronic lock 10 can have an actuator which can toggle a mechanical feature of the electronic lock 10 between an unlocked (e.g., unblocked) and a locked (e.g., blocked) state, and the details of how this is achieved may vary significantly from one embodiment to another.

In the illustrated embodiment, the keypad 14 is a backlit keypad which is only visible when the electronic lock is in an "awake" mode, shown in FIG. 1A. By default, the electronic lock 10 can be in a sleep mode, such as shown in FIG. 1B, where the backlit keypad is not readily visible. The awake mode being only sporadically activated during normal use, the sleep mode can allow energy savings during the extended periods when the lock's authorization functionality is not being requested by the user(s).

For instance, in an embodiment where touch sensors 24*a*, 24*b*, 24*c* (FIG. 2A) are associated to different characters (22*a*, 22*b*, 22*c*) of the keypad 14, the electronic lock 10 may be configured to toggle from the sleep mode to the awake mode when a touch signal is generated at a selected one, at any one, or at more than one of the touch sensors 24*a*, 24*b*, 24*c*. In an embodiment where a proximity sensor (not shown) is incorporated to the electronic lock 10, the electronic lock 10 may be configured to toggle from the sleep mode to the awake mode when the proximity sensor detects a proximity to a user. In the embodiment illustrated, a visual reference 26 provided in the general area of the keypad 14, provided here in the form of a lightly shaded square, remains visible to the user permanently, even when the electronic lock is in the sleep mode, to guide the user to apply a touch at a position where the touch results in signal generation at a touch sensor which results in waking the electronic lock 10. This latter feature is entirely optional.

As will be detailed further below, the electronic lock 10 can have a controller. The controller may be referred to as the lock computer for instance. The controller can be configured to receive access credentials from the user, via the input interface, and determine whether or not the access credentials are authorized, such as via comparing the access credentials to access data in a computer readable memory. Depending on the type of lock, the access data may be stored locally, in a computer readable memory integrated within a housing of the electronic lock, or remotely, in a computer readable memory remote from the housing of the electronic lock, such as in the cloud or in a remote server. The controller can be responsible for activating the actuator which toggles the mechanical feature of the electronic lock between the locked and unlocked state. The controller can be configured to toggle the mechanical feature of the electronic lock back to the locked state when certain conditions are met, such as after a certain period of time has elapsed. The electronic lock 10 may also be mechanically biased for the mechanical feature of the electronic lock 10 to be mechanically driven to the locked state absent a contrary force from the actuator.

In the embodiment shown, the electronic lock 10 has a housing 28. The housing 28 has a wall portion 30 which can be exposed at the front for the wall portion 30 to be visible to a user. The wall portion 30 can thus bear the keypad 14 and the visual indicator 16, and in this embodiment also the handle 20. In the specific embodiment shown, the wall portion 30 is incorporated as a facing of the electronic lock 10, has a structure of plastic material, and is separable from a body 32 of the electronic lock 10. In this embodiment, the body 32 better seen in FIG. 2B, is made of metal.

Figure 2B:
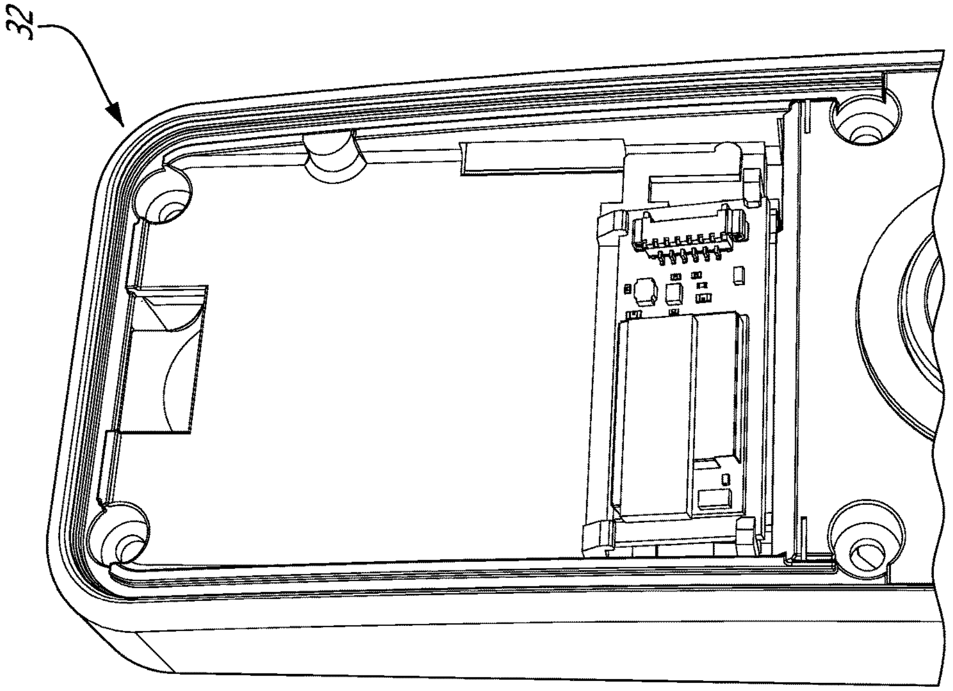
FIG. 2B is an oblique view of a body of the electronic lock, without the cover.

The body 32 of the electronic lock 10, shown in FIG. 2B, can have some mechanical, electromechanical, and electronic components incorporated therein. The facing which bears the wall portion 30, shown in FIG. 2A, can have, as more clearly shown in FIG. 3A, an outer shell 34 made of plastic material(s), underlayed by additional components including a flat light guide 36 and a flexible printed circuit board 38 incorporating touch sensors 24*a*, 24*b*, 24*c*, LEDs including a first set of LEDs 40 (e.g., white LEDs) and a second set of LEDs 42 (e.g., multi-color LEDs), and optionally, in this case, a RFID antenna 18 forming components of the user interface 12.

Figure 2A:
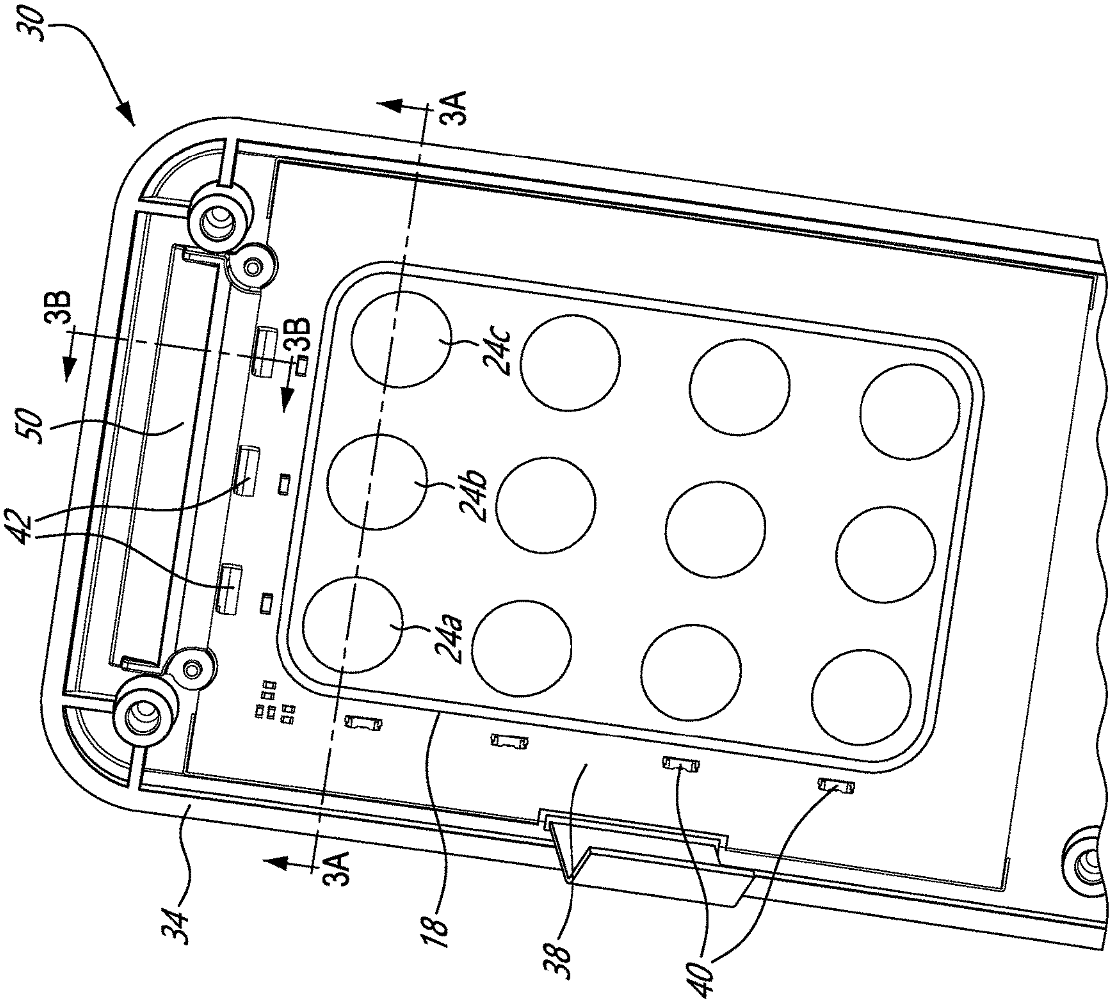
FIG. 2A is an oblique view of a cover of the electronic lock, showing an internal face thereof.
Figure 3A:
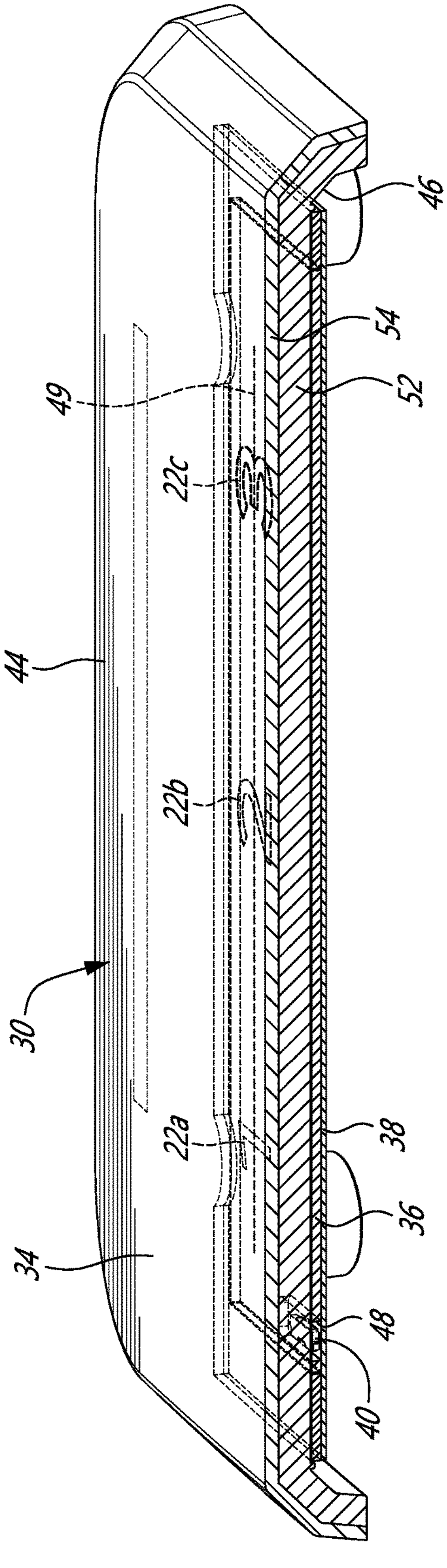
FIGS. 3A and 3B are cross-sectional views taken along cross-section lines 3A-3A and 3B-3B of FIG. 2A, respectively.
Figure 4:
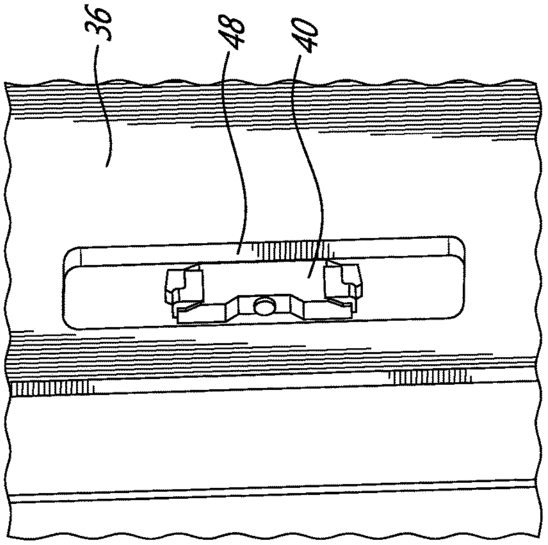
FIG. 4 is an enlarged oblique view showing an optical coupling between an LED and a light guide.
Figure 3B:
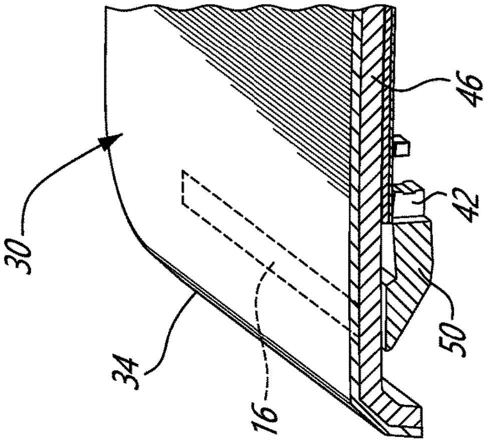

The details of construction of this specific embodiment are presented in greater detail in FIGS. 3A, 3B and 4. FIG. 3A, in particular, presents more details of the layered structure underlying the keypad 14 and its mode of operation. More specifically, the wall portion 30 can be seen to be generally flat (though it can have a certain degree of curvature for practical and/or design considerations), include an external face 44, exposed to the user, and an internal face 46. A layer, or sheet, in the form of a flat light guide 36 is provided against the internal face. The light guide 36 can be formed of a translucent polymer. An example light guide which can offer suitable functionality in this context is manufactured by $e_2$ip TECHNOLOGIES under the tradename Lumifilm®. Moreover, in this embodiment, a flexible printed circuit board 38 (flex PCB) is provided in the form of an additional layer which can be adhered to the internal face of the light guide layer. The flexible PCB 38 can have touch sensors in the form of a plurality of capacitive sensors 24*a*, 24*b*, 24*c* (FIG. 2A), with each capacitive sensor being transversally aligned, in an orientation normal to the wall portion, with a corresponding character 22*a*, 22*b*, 22*c* of the keypad 14.

The flexible PCB 38 can also have, integrated thereto, a number of light sources, such as LEDs for instance. In this embodiment, a first set of LEDs 40, white LEDs in this example, are positioned in a manner to propagate light into and along the light guide 36, across a lateral edge 48 of the sheet material of the light guide 36 (into a thickness of the light guide 36).

The characters 22*a*, 22*b*, 22*c*, can be defined as translucent areas extending across the thickness of the wall portion 30, and the areas of the wall portion which surround the translucent areas/characters can be opaque. In practice, this can be achieved, for instance, by printing an opaque coating, in the negative, onto a wall portion 30 which is otherwise made of translucent material. The light guide 36 can be configured to propagate light within its plane due to total internal reflection against its external face and internal face, except for certain areas which can be treated in a manner for more light to escape (such as areas which correspond to the location of the characters 22*a*, 22*b*, 22*c* in an embodiment). The light guide 36 can be optically coupled to the translucent areas of the wall portion 30. Accordingly, light emitted by a LED 40 can propagate, within the light guide 36, along an axis parallel to the axis 49 along which the characters 22*a*, 22*b*, 22*c* of a sequence of characters, such as a row or column of characters, and escape the light guide mostly through the translucent areas forming the characters 22*a*, 22*b*, 22*c*, due to the optical coupling, giving the user the visible perception of illuminated characters 22*a*, 22*b*, 22*c*.

In practice, however, optical losses will occur along the axis of light propagation, in the direction extending from the corresponding light source 40 to the character 22*c* most remote to the light source 40. Such losses will occur at each one of the characters 22*a*, 22*b* in the axis of light propagation, and may also occur due to other reasons (such as imperfections in the external or internal surfaces, imperfect transparency of the medium, or undesired sources of optical coupling/faults). For such reasons, in practice, the user may visually perceive a gradually decreasing brightness in the characters 22*a*, 22*b*, 22*c*, in the direction of light propagation. In certain cases, this may give the user an unpleasing perception, which the user may associate to a lack of quality.

One way of compensating such optical losses is to increase the boldness of the characters 22*a*, 22*b*, 22*c* from one character to another in the direction of light propagation, as somewhat exaggerated between character 22*b* and character 22*c* in FIG. 3A, which can allow progressively more surface area for light to be guided to the user through wall portion 30. Accordingly, the increased surface area can compensate for the reduction in light density and give the user an overall perception (or illusion) of same brightness for each one of the characters 22*a*, 22*b*, 22*c* in the axis of light propagation. It was found that the enlargening or boldening of the characters may, at least in some embodiments, be significantly less perceivable by an average user than the decrease in brightness which may otherwise result. Indeed, the increase in boldness may be barely visible to the eye, such as being in the order of the thousandth of an inch in an embodiment of font having a width in the order of a tenth of an inch (e.g., increase in boldness in the order of 100 times smaller than width of font), yet still allow sufficiently more light across the character to achieve a more uniform brightness.

It will be understood here that boldness refers to the width of the traits which are used to form the pattern associated to the character 22*a*, 22*b*, 22*c*. In the case of the number one, for instance, a long trait is used, the width of which can correspond to its boldness. In the case of many fonts, the boldness, or width of the traits, is constant throughout the character.

In one embodiment, the boldness of the characters 22*a*, 22*b*, 22*c* can increase linearly as a function of the distance from the light source along the light propagation axis. For instance, the boldness, size, or dimension of the font can be progressively increased by 0.001", 0.0015" or 0.002" at each one of the characters along the axis of light propagation. In another embodiment, the boldness of the font can increase non-linearly (e.g., exponentially) along the axis of light propagation. For instance, the boldness of the font may increase by 0.0015" between the first and the second character in the axis of light propagation, and then by 0.002", or 0.0025", between the second and the third character in the axis of light propagation.

In the embodiment presented in FIG. 1A, the characters include 10 numerical characters and two symbols, specifically * and #, arrayed in a 3 by 4 array of characters. Such an example configuration is common for numerical keypads. In one example embodiment, only 4 LED light sources may be used to illuminate all 12 characters. Referring to FIG. 2A, for instance, one can see that in this embodiment, 4 LEDs 40 are used to operate the keypad display, and one LED is associated to each one of the 4 sequences (rows in this case) of characters. In an alternate embodiment, only 3 LEDs may be used, such as one for each one of the three columns of characters.

Referring to FIG. 4, in this specific embodiment, the LEDs 40 can be introduced into apertures formed across the thickness of the layer forming the light guide 36. In an alternate embodiment, the LEDs may be provided adjacent a straight lateral edge of the layer forming the light guide, for instance. In such cases, a single, unitary flat light guide may be used to guide the light of each one of the LEDs to each one of the characters of the sequence. Alternately, individual separate, elongated light guides may be used to guide the light of corresponding ones of the LEDs to corresponding ones of the characters, or more specifically, to corresponding ones of a plurality of sequences of characters corresponding to different rows or different columns.

In the embodiment presented in FIG. 2A, a different strategy is used to illuminate the visual indicator 16. As best seen from both FIG. 2A and FIG. 3B, a curvilinear light guide 50 is used in this case to propagate light received parallel to the wall portion in an ingress of the light guide, to normal to the wall portion out the visual indicator 16. A number of LEDs 42 spaced apart from one another may feed light into the transversally oriented edge forming the ingress of the light guide 50. Similarly to the characters 22*a*, 22*b*, 22*c*, the visual indicator 16 can be defined as a translucent portion of the wall portion 30 surrounded by otherwise opaque areas of the wall portion. Light can spread and mix to a certain extent within the curved light guide 50 to provide the user with a uniform light output at the egress in the outer face of the wall portion. The visual indicator 16 may light green when the access has been authorized/granted by the controller, red when the access has been negated by the controller, or yellow if a technical problem is detected, based on the way the multi-color LEDs are controlled by the controller, to name some examples.

Referring back to FIG. 3A, an example method of fabrication will now be detailed. In the example method of fabrication, the wall portion 30 is made of two transparent layers: a core 52 and an overlay 54. In this example, the overlay 54 is harder and has greater scratch resistance than the core 52. The core 52 is more structural and can be selected to offer fire resistance. The overlay 54 can be manufactured first, such as by thermoforming from a sheet for instance. Ink can be printed on the underside, or inner surface, of the overlay, when the overlay is a planar sheet, i.e., prior to thermoforming. The ink can provide opaqueness to an otherwise translucent material. The characters 22*a*, 22*b*, 22*c* can be printed in the negative by the ink, i.e. the ink can be applied to cover the entirety of the inner surface of the overlay 54 except the characters 22*a*, 22*b*, 22*c* themselves, which are left free from ink, and thus translucent rather than opaque across the thickness (the ink otherwise causing the opaqueness across the thickness).

In this embodiment, a visual reference 26, provided here in the form of a square with rounded corners, may also be printed at this stage, such as with an ink of a different color.

The overlay 54 can then be thermoformed to take a curved shape. This step may stretch the overlay 54 to a certain extent, and the stretching may be uneven, so care may need to be taken in the printing of the characters 22*a*, 22*b*, 22*c* to avoid their deformation by the thermoforming step. In an embodiment, the characters 22*a*, 22*b*, 22*c* can be printed in a warped manner taking into consideration the expected deformation by the thermoforming step, and then be de-warped, and deformed into their intended shape by the thermoforming step.

The overlay 54 can then be placed inside a mould, and the core 52 can be overmoulded onto the overlay 54. Injection moulding may be used to this end. Care may need to be taken in the selection of the moulding temperature to avoid washing out of the ink when moulding. The overlay may have a thickness in the order of a tenth of an inch, whereas the core 52 may have a thickness of a few tenths of an inch, for instance.

The flex PCB 38 can be adhered to the light guide layer 36, and the light guide layer 36 can be adhered to the underside, or inner face 46, of the wall portion 30, e.g., against the core 52. This example manufacturing method is provided solely for illustrative purposes, and it will be understood that different ways of manufacturing the wall portion 30 can be used in different embodiments.

Figure 5A:
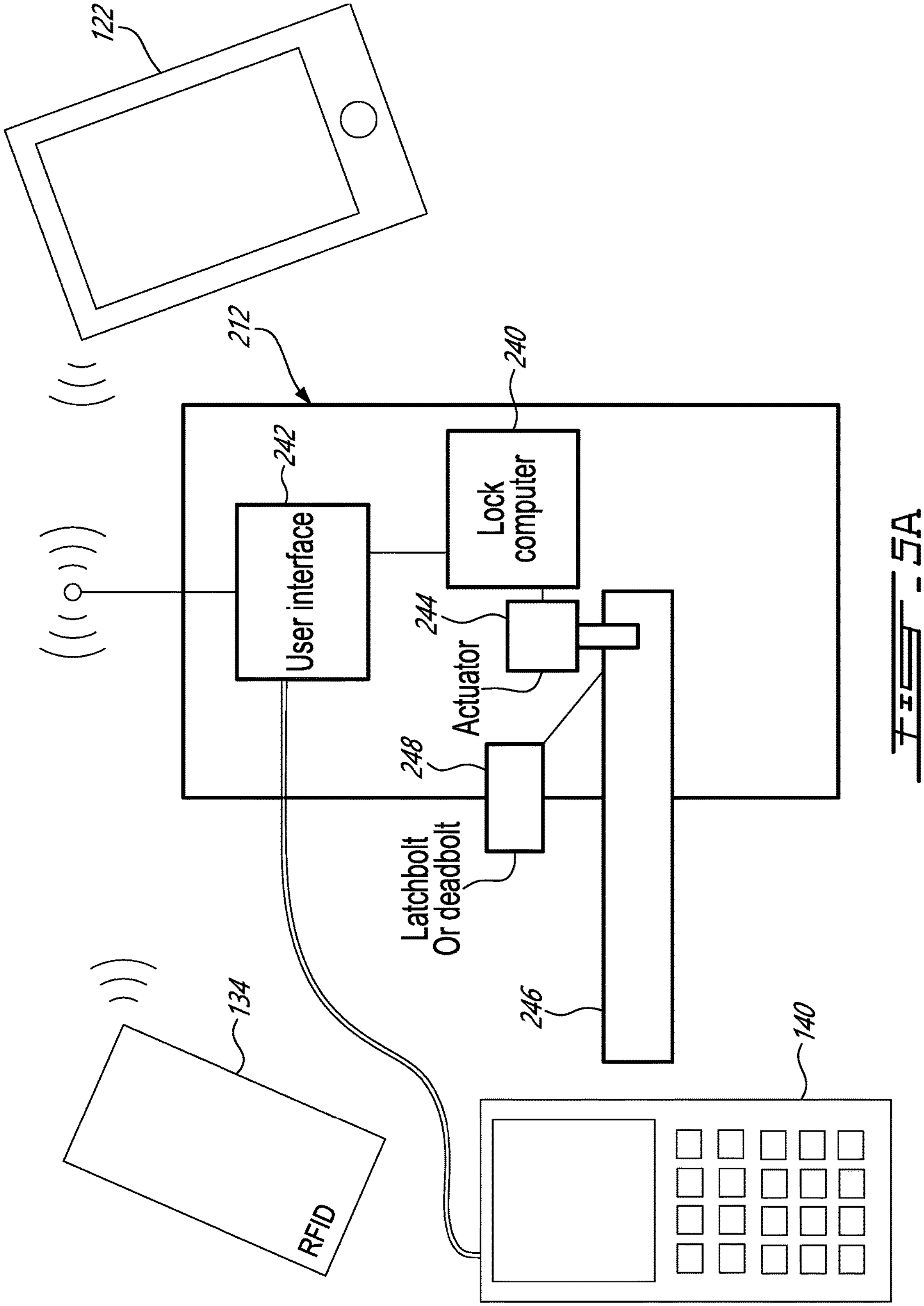
FIG. 5A is a schematic view of an alternate example of an electronic lock.

FIG. 5A schematizes one possible embodiment of an electronic lock 212 which can be seen to have a lock computer 240. The lock computer 240 can alternately be referred to as a controller. The lock computer 240 can be configured to receive an input from an input interface 242 and to control an actuator 244 which can selectively block or unblock a handle 246 which controls a bolt, pull or push a deadbolt 248, block or unblock a latch bolt, for instance, in this example. The electronic lock 212 can further have a time awareness module, such as an internal clock or timer, accessible by the lock computer 240 to determine whether any time-related authorization conditions are met or not. It will be understood that this is but one example of an embodiment of an electronic lock, and that many alternate configurations are possible in other embodiments. In particular, it will be understood that the different electronic elements or computerized functionalities of the electronic lock can be incorporated in a same or distributed in different housings, a same or different computing devices, and be configured for communicating with one another in a wired or wireless manner. The embodiment presented in FIG. 5A is an example relatively typical for the North American market where the lock computer 240, user interface 242 (which may include a keypad and optionally a RFID antenna), time awareness module, and actuator 244 are all integrated to a single housing of an electronic lock 212, an alternate example of which is electronic lock 10 presented in FIGS. 1 to 4.

The operation of the electronic lock 212 can be done in different ways. A first way is to enter a user code (e.g., sequence of numerical or alphanumerical characters possibly including symbols) via the keypad. Other ways of providing the access credentials is by encoding a keycard 134 or a user device 122. In some embodiments, keycards 134 and electronic keys 122 are configured to interface via connectivity features of the electronic lock 212. In still another embodiment, the user interface may include a port connected for wired connectivity to a maintenance device 140, to name yet another example. In the example shown in FIG. 5B, the electronic lock 212 is configured to interface with the keycards 134 via RFID, and optionally to interface with guest devices 122 (bearing electronic keys) via Bluetooth™ low energy (BLE) for instance. In such an embodiment, the keycards 134 can be seen as passive electronic devices. The electronic locks 212 are also configured to interface with a maintenance unit 140 via a wired connection, such as USB. These details are provided solely for the sake of providing examples, and in alternate embodiments, different interfacing technologies (e.g. Wifi, wireless access point (AP), near-field communication (NFC)) may be used with different interfacing devices and the details are left entirely to the designer of the electronic lock 212.

Figure 5B:
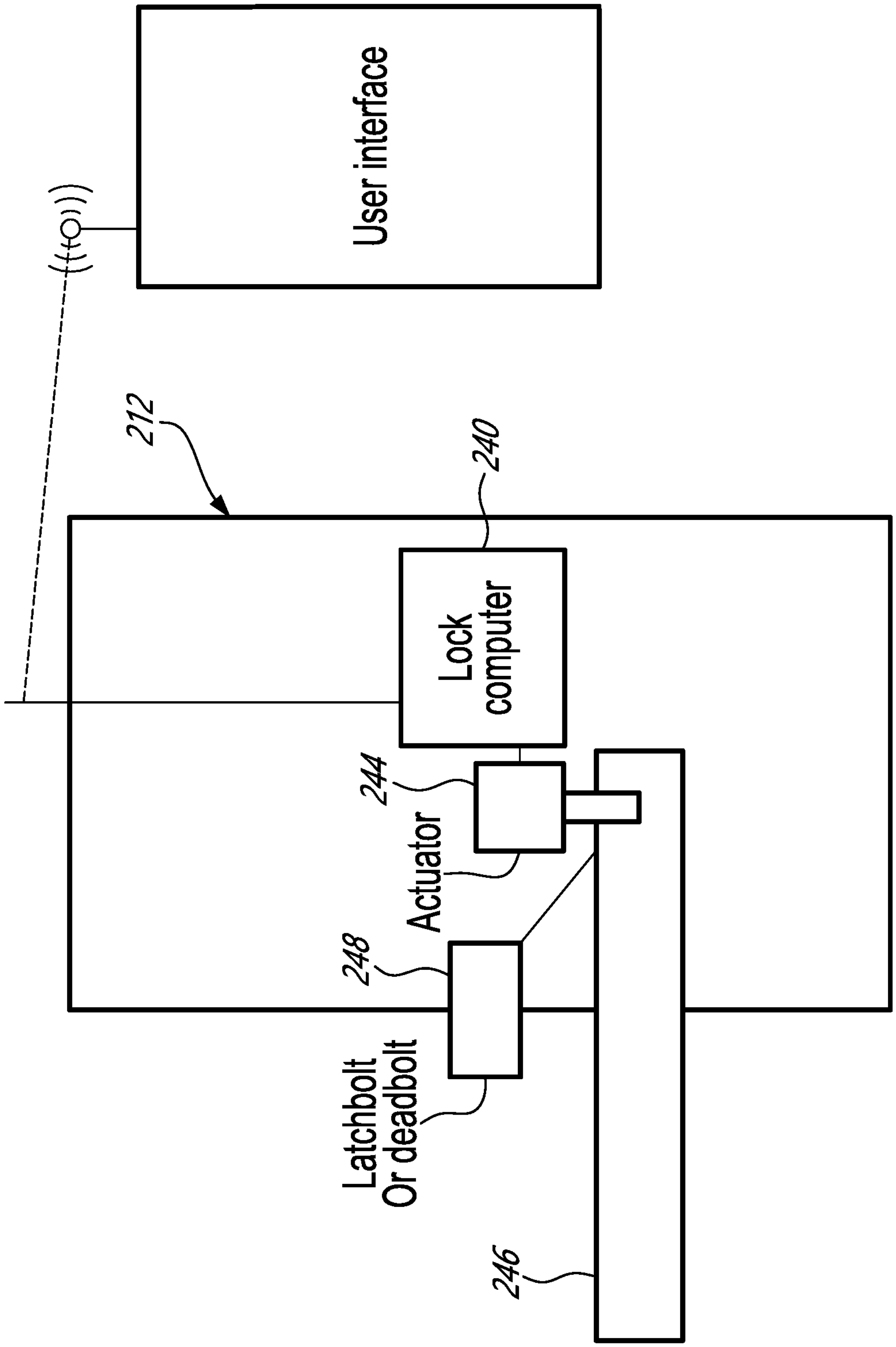
FIG. 5B is a schematic view of another alternate example of an electronic lock.

FIG. 5B provides a different example of an electronic lock which is relatively typical for the European market where the lock computer 240, time awareness module and actuator 244 are all integrated to a main housing associated to the latch or deadbolt of the electronic lock 212, but the user interface, which can include a keypad, may be manufactured and installed separately and configured to communicate with the lock computer 240 in a wired or wireless manner. The user interface can be adhered or fastened on a wall or on the door, in proximity to the main housing, at the premises of the electronic lock, for example.

A keypad typically has a number of keys associated to corresponding characters. The most typical use case is 10 digits and 2 symbols, but other embodiments are possible. The characters of a user code can be constrained to the characters associated to the keys of the keypad, and to this end, it can be desired to standardize the keypad for the electronic locks, or to limit the characters of the user codes to characters known to be common to keys of all keypads of all locks.

Figure 6:
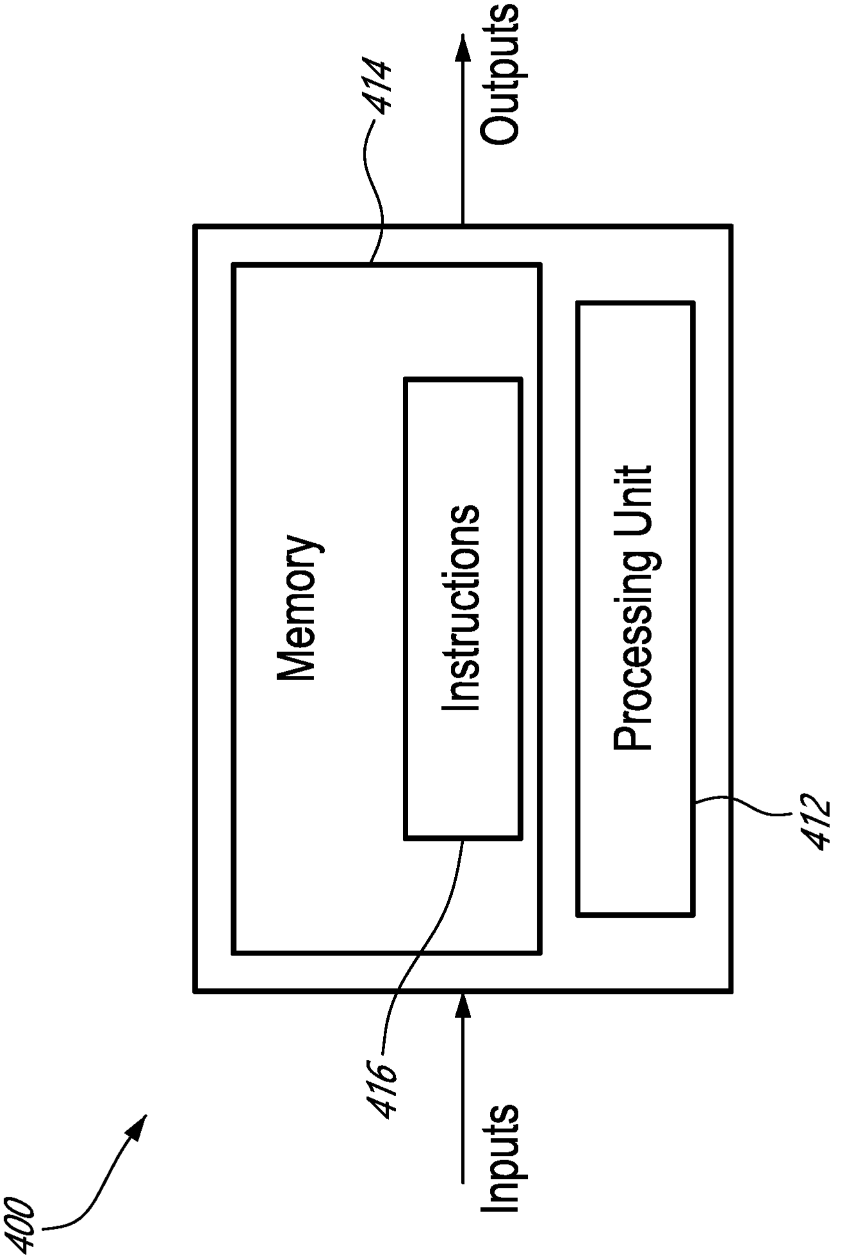
FIG. 6 is a schematic view of a computer.

Referring to FIG. 6, it will be understood that the expression "computer" 400 as used herein is not to be interpreted in a limiting manner. It is rather used in a broad sense to generally refer to the combination of some form of one or more processing units 412 and some form of memory system 414 accessible by the processing unit(s). The memory system can be of the non-transitory type. The use of the expression "computer" in its singular form as used herein includes within its scope the combination of a two or more computers working collaboratively to perform a given function. Moreover, the expression "computer" as used herein includes within its scope the use of partial capabilities of a given processing unit.

A processing unit can be embodied in the form of a general-purpose micro-processor or microcontroller, a digital signal processing (DSP) processor, an integrated circuit, a field programmable gate array (FPGA), a reconfigurable processor, and a programmable read-only memory (PROM), to name a few examples.

The memory system can include a suitable combination of any suitable type of computer-readable memory located either internally, externally, and accessible by the processor in a wired or wireless manner, either directly or over a network such as the Internet. A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) to name a few examples.

A computer can have one or more input/output (I/O) interface to allow communication with a human user and/or with another computer via an associated input, output, or input/output device such as a keyboard, a mouse, a touchscreen, an antenna, a port, etc. Each I/O interface can enable the computer to communicate and/or exchange data with other components, to access and connect to network resources, to serve applications, and/or perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, Bluetooth, WiMAX), SS7 signaling network, fixed line, local area network, wide area network, to name a few examples.

It will be understood that a computer can perform functions or processes via hardware or a combination of both hardware and software. For example, hardware can include logic gates included as part of a silicon chip of a processor. Software (e.g. application, process) can be in the form of data such as computer-readable instructions stored in a non-transitory computer-readable memory accessible by one or more processing units. With respect to a computer or a processing unit, the expression "configured to" relates to the presence of hardware or a combination of hardware and software which is operable to perform the associated functions. Different elements of a computer, such as processor and/or memory, can be local, or in part or in whole remote and/or distributed and/or virtual.

The methods and systems of the present disclosure may be implemented in a high level procedural or object oriented programming or scripting language, or a combination thereof, to communicate with or assist in the operation of a computer system, for example the controller or lock computer 240. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 402 of the computing device 400, to operate in a specific and predefined manner to perform the functions described herein, for example those described in the method 500.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments. The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

As can be understood, the examples described above and illustrated are intended to be exemplary only. The scope is indicated by the appended claims.

What is claimed is:

1. A keypad comprising:

a housing having a wall portion, the wall portion having a thickness, an internal face, and an external face exposed to a user;

a sequence including a plurality of characters aligned along an axis parallel to the wall portion, the characters of the sequence defined by corresponding translucent areas extending across the thickness of the wall portion;

a set of sensors, the sensors of the set underlying corresponding ones of the characters of the sequence;

a light guide underlying the wall portion, the light guide being optically coupled to the translucent areas via the internal face; and a light source offset from the plurality of characters, operable to propagate light through the light guide in a direction of the axis;

wherein the characters of the sequence of characters are enlargened from one character to another in the direction of the axis.

2. The keypad of claim 1 further comprising a printed circuit board adhered to an inner surface of the light guide, wherein the sensors include a plurality of capacitive sensors forming part of the printed circuit board.

3. The keypad of claim 2 further comprising a radio-frequency identification (RFID) antenna integrated to the printed circuit board.

4. The keypad of claim 1 wherein the light source comprises a light emitting diode (LED).

5. The keypad of claim 1 wherein the sequence of characters comprises a first sequence of characters, a second sequence of characters and a third sequence of characters each parallel and adjacent to the first sequence of characters, wherein the second sequence of characters is associated with a second light source and a subset of the set of sensors and wherein the third sequence of characters is associated with a third light source and a subset of the set of sensors.

6. The keypad of claim 1 wherein the sequence of characters includes at least 3 numerical characters.

7. The keypad of claim 1 wherein the enlargening of the characters is linear from one character to another in the direction of the axis.

8. The keypad of claim 1 wherein the enlargening of the characters is exponential from one character to another in the direction of the axis.

9. The keypad of claim 1 wherein the enlargening of the characters from one character to another in the direction of the axis is in the order of a thousandth of an inch, wherein the characters are made of traits having a width in the order of a tenth of an inch.

10. The keypad of claim 1 further comprising a reference feature integrated to the wall portion and visible to the user at all times.

11. The keypad of claim 1 wherein the wall portion has at least two layers, and an opaque coating provided between the two layers, the opaque coating providing opaqueness around the translucent areas, and absences of the opaque coating defining the translucent areas.

12. An electronic lock for locking or unlocking a door of a premises, the electronic lock comprising:
- at least one housing;
- a lock mechanism integrated to the at least one housing, the lock mechanism actuatable for the locking or unlocking of the door;
- an actuator coupled to the lock mechanism;
- a keypad having
  - a wall portion defined by the at least one housing, the wall portion having an external face exposed to a user;
  - a sequence including a plurality of characters aligned along an axis parallel to the wall portion, defined by corresponding translucent areas of the wall portion, the characters of the sequence of characters being enlargened from one character to another in the direction of the axis;
  - a set of sensors underlying corresponding ones of the characters of the sequence;
  - a light guide underlying the wall portion, the light guide optically coupled to the translucent areas; and
  - a light source offset from the plurality of characters, operable to propagate light through the light guide; and
- a controller integrated to the at least one housing, the controller operatively connected to the actuator, and to the keypad, the controller operable to control the actuator for unlocking the door contingent upon validating access credentials received from the keypad against access data.

13. The electronic lock of claim 12 further wherein the at least one housing is a single housing, and the wall portion forms part of a shell covering a body portion of the housing.

14. The electronic lock of claim 12 further comprising a visual indicator displaying an indication of a result of a comparison of the access credentials against the access data to the user.

15. The electronic lock of claim 14 wherein the visual indicator includes a visual indicator translucent area defined in the wall portion, and a curvilinear light guide optically coupling a plurality of colored light sources to the visual indicator translucent area.

16. A keypad for an electronic lock, the keypad comprising:
- a front face having an exterior surface and an interior surface defining a thickness therebetween;
- a first character defined by a first translucent portion extending through the thickness of the front face;
- a second character defined by a second translucent portion extending through the thickness of the front face; and
- a light source positioned behind the interior surface of the front face and offset from at least one of the first translucent portion and the second translucent portion;
- wherein the first character is defined by a first dimension and the second character is defined by a second dimension, the second dimension is enlarged as compared to the first dimension.

17. The keypad of claim 16, wherein the light source is associated with a light guide positioned behind the front face and extending at least partially along the interior surface between the first translucent portion and the second translucent portion, the light guide configured to transfer light emanating from the light source to at least the first translucent portion and the second translucent portion.

18. The keypad of claim 16, further comprising a third character defined by a third translucent portion, the third character having a third dimension enlarged as compared to the second dimension, wherein the first character, the second character, and the third character form a row on the keypad and are generally aligned along a horizontal axis on the exterior surface of the front face, and wherein the light source is positioned closer to the first translucent portion as compared to the second translucent portion and the third translucent portion.

19. The keypad of claim 16, further comprising a third character defined by a third translucent portion, the third character having a third dimension enlarged as compared to the second dimension, wherein the first character, the second character, and the third character form a column on the keypad and are generally aligned along a vertical axis on the exterior surface of the front face, and wherein the light source is positioned closer to the first translucent portion as compared to the second translucent portion and the third translucent portion.

* * * * *